United States Patent [19]

Mourot et al.

[11] Patent Number: 5,864,589
[45] Date of Patent: Jan. 26, 1999

[54] DEVICE FOR MAKING DECISIONS BY ESTIMATING THE VITERBI ALGORITHM IN A MOBILE RADIO SYSTEM

[75] Inventors: Christophe Mourot, Asnieres; Vinod Kumar, Paris, both of France

[73] Assignee: Alcatel Mobile Communication France, Paris, France

[21] Appl. No.: 441,440

[22] Filed: May 15, 1995

[30] Foreign Application Priority Data

May 20, 1994 [FR] France .................................. 94 06180

[51] Int. Cl.[6] .................................................. H03D 1/00
[52] U.S. Cl. ............................................ 375/341; 371/43.7
[58] Field of Search .................................. 371/43.6, 43.7, 371/43.8; 375/261, 262, 263, 265, 266, 340, 341, 346, 348, 349, 350, 316, 324; 455/517

[56] References Cited

U.S. PATENT DOCUMENTS 5,287,385  2/1994  Sugawara et al. ...................... 375/230

FOREIGN PATENT DOCUMENTS

WO 94 09582  4/1994  WIPO .

OTHER PUBLICATIONS

Proakis, John G., "Digital Communications"–McGraw Hill Book Company, 1988.
Wozencraft et al., "Principles of Comunications Engineering" John Wiley & Sons, 1985.

*Signal Processing. European Journal Devoted to the Method, and Applications of Signal Processing*, vol. 25, No. 3, Dec. 1991, Amsterdam, pp. 307–318, Morgul eet al. "Decision Directed Channel Parameter Estimation and Tracking Using Erroneous Detectors".

*IEEE Journal on Selected Areas in Communication*, vol. 11, No. 7, Sep. 1993, New York, US, pp. 1034–1045, Liu et al., "A Soft–output Bidirectional Decision Feedback Equalization Technique for TEMA Cellular Radio".

*Primary Examiner*—Chi H. Pham
*Assistant Examiner*—Bryan Webster
*Attorney, Agent, or Firm*—Sughrue, Mion, Zinn, Macpeak & Seas, PLLC

[57] ABSTRACT

In a mobile radio system including mobile terminals each terminal comprises, on the receiving side, a unit using the Viterbi algorithm for equalization or for decoding the received signals after demodulation. A decision device of this system calculates the mean and the standard deviation of the metrics of each branch of the Viterbi algorithm, determines a quality level of a transmission parameter corresponding to the results of this calculation and compares the estimated quality level and a required quality level of the parameter in order to produce a decision signal supplied to a decision unit which can modify one or more transmission characteristics.

8 Claims, 1 Drawing Sheet

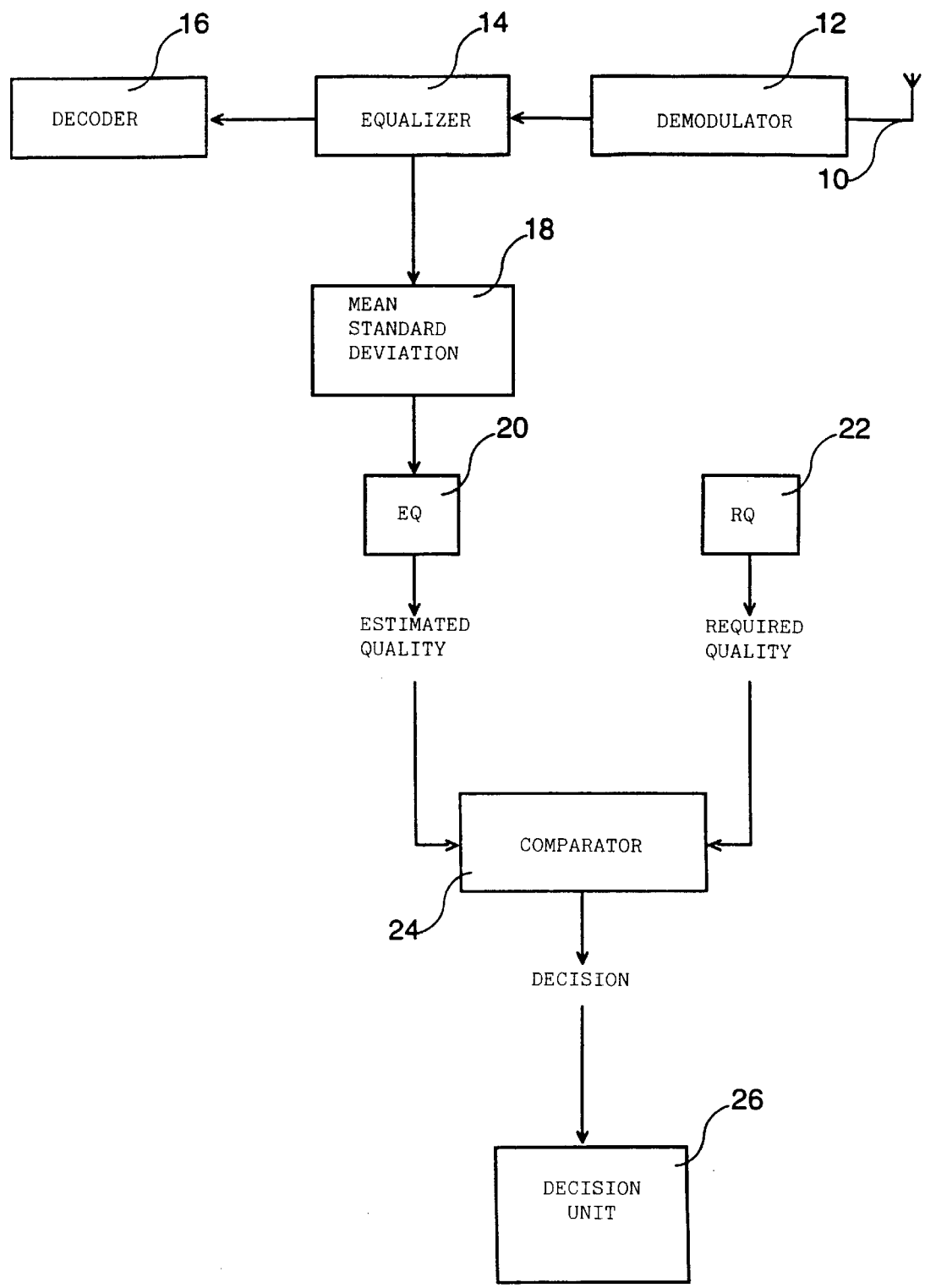
SINGLE FIGURE

DEVICE FOR MAKING DECISIONS BY ESTIMATING THE VITERBI ALGORITHM IN A MOBILE RADIO SYSTEM

BACKGROUND OF THE INVENTION

1. Field of the Invention

The present invention concerns estimating transmission quality in a mobile radio system and in particular a device for making decisions by estimating the Viterbi algorithm in a mobile radio system.

2. Description of the Prior Art

In GSM or DCS mobile radio systems previous data and the Viterbi algorithm are used for decoding received data information and/or equalization. A description of this algorithm and the associated processing can be found in the article "The Viterbi algorithm" published in Proceedings of the IEEE, vol 61, No 3, March 1973, pages 268–278.

The problem with using the Viterbi algorithm is estimating the quality of the result because the determination of a received symbol is based on the calculation of the best path linking the received symbols during a predetermined number of baud times, the various possible paths being associated with cumulative mathematical magnitudes call metrics. Estimating the quality of the result obtained therefore entails comparing the total metric of the best path to a predetermined threshold. If the value of the metric is above the threshold the quality is deemed to be good; otherwise the quality is deemed to be bad.

Estimating the quality of the result of the Viterbi algorithm is useful for making various decisions, for example a decision to adjust the transmission power or to change cell.

Unfortunately, calculating the metric for the best path gives no information on local differences between the best path and the possible path, and these can be major differences.

For this reason the object of the invention is to provide a device for estimating the quality of the Viterbi algorithm used by a mobile radio network terminal so that it can be supplied to a decision unit of the system to modify therein one or more transmission parameters.

SUMMARY OF THE INVENTION

The invention therefore consists in a device for making decisions in a mobile radio system of the GSM or DCS type including means for calculating the mean and the standard deviation of the metrics of each branch of said Viterbi algorithm, means for determining a quality level of a transmission parameter corresponding to the result applied by said calculation means, and a comparator for comparing the estimated quality level supplied by the determination means and a required quality level of the parameter in order to produce a decision signal according to the result of the comparison, said decision signal being supplied to a decision unit adapted to modify one or more transmission characteristics in response to the decision signal.

BRIEF DESCRIPTION OF THE DRAWINGS

The aims, objects and features of the invention will emerge more clearly from the following description given with reference to the single FIGURE which shows one embodiment of the device of the invention.

DETAILED DESCRIPTION OF THE INVENTION

Referring to the FIGURE, the information signals are received in a mobile terminal of a GSM mobile radio network via an antenna 10. The signals are then demodulated and digitized in the demodulator 12. They are then equalized by an equalizer 14 which, for the purposes of the invention, is assumed to use the Viterbi algorithm. To obtain them in their original form the equalized signals are then treated in various modules lumped together in the FIGURE in the form of a decoder unit 16.

In accordance with the invention, the results obtained using the Viterbi algorithm in the equalizer 14 are processed in the following manner in a unit 18 for calculating the mean and the standard deviation. Consider first the best path which passes through various states of the Viterbi algorithm trellis. A branch metric is calculated for each state. The metrics are progressively stored in memory. The mean and the standard deviation of the branch metrics are then calculated.

The mean and the standard deviation are then placed in a truth table 20 in which a correspondence is established between the inputs in the form of the mean and standard deviation and a required quality for a block of data or for a plurality of blocks of data, depending on the measurement window.

The required quality may be expressed as a bit error rate, a decision weighting quality or a signal/noise ratio. Its exact content depends on the decision to be taken.

The truth table 20 (EQ) thus supplies an estimated quality level dependent on the quality of the Viterbi algorithm. This quality level is then compared to a required quality level supplied by another table 22 in a comparator 24. The output of the comparator is a binary decision signal which is passed to a decision unit 26 adapted to modify one or more transmission characteristics in response to the decision signal.

The various units constituting the device of the invention are incorporated into the mobile terminal except for the decision unit 26 which can be either in the mobile terminal or in the network, for example in the base transceiver station (BTS). In a GSM or DCS type network, decisions concerning transmission (power adjustment or change of cell) are taken by the network. In a DECT type network, on the other hand, the decision unit which makes these decisions is in the terminal itself. In a GSM network the decision signal is transmitted to the control station via a transmission channel, of course.

Note that the truth table 20 is constructed beforehand by field measurements and simulation. This truth table could of course be replaced by a data processing device calculating each time the estimated quality as a function of input parameters comprising the mean and the standard deviation for the branch metrics.

The benefit of the invention is that it refines and improves the decision process by means of a closer correlation between the set of mean and standard deviation pairs and the estimated quality. The branch metric is given by the Euclidian distance between the possible branch and the branch received. The quality is also inversely proportional to the standard deviation, i.e. the closer to zero the branch metric remains along the complete path, the better the quality. Consequently, a received data block having these features can be deemed to be entirely reliable, and vice versa. Generally, any data block having a high standard deviation must be deemed to be erroneous.

Although in the embodiments described above the results produced by the Viterbi algorithm used in the equalizer are processed, it goes without saying that results supplied by the Viterbi algorithm used to decode data could be processed in the same way.

There is claimed:

1. Device for making decisions in a mobile radio system of the type including mobile terminals each of which comprises, for receiving information signals, a unit using the Viterbi algorithm for equalization or for decoding the received signals after demodulation, said device comprising:

calculation means for calculating the mean and the standard deviation of the metrics of each branch of said Viterbi algorithm;

determining means for determining a quality level of a transmission parameter corresponding to the results applied by said calculation means;

a comparator for comparing an estimated quality level supplied by said determination means and a required quality level of said parameter in order to produce a decision signal according to the result of the comparison, and a decision unit which receives said decision signal and determines whether to modify one or more transmission characteristics of said mobile radio system in response to said decision signal.

2. Device according to claim 1 wherein said decision unit is in the control station of said terminal.

3. Device according to claim 1 wherein said decision unit is in said terminal.

4. Device according to claim 1 wherein said unit using the Viterbi algorithm is the equalizer of said terminal.

5. Device according to claim 1 wherein said unit using the Viterbi algorithm is the decoder of said terminal.

6. Device according to claim 1 wherein said means for determining a quality level of a transmission parameter comprise a truth table the input and output values of which are established beforehand by simulation.

7. A method of making decision in a mobile radio system of the type including mobile terminals each of which includes a unit using the Viterbi algorithm for processing received signals, the method comprising the following steps:

calculating the mean and the standard deviation of the metrics of each branch of said Viterbi algorithm;

determining the quality level of a transmission parameter corresponding to the result supplied in the calculation step;

comparing said quality level of said transmission parameter with a required quality level of said parameter in order to produce a decision signal, and sending said decision signal to a decision unit adapted to modify one or more transmission characteristics of said mobile radio system.

8. Method according to claim 7 wherein said decision signal is used to command a change of cell.

* * * * *